United States Patent [19]

Reed, deceased et al.

[11] 4,176,987

[45] Dec. 4, 1979

[54] FLUENT MATERIAL HANDLING APPARATUS

[75] Inventors: Frank A. Reed, deceased, late of South El Monte, Calif., by Paul M. Diemert, executor, 23 Woodsbluff Run, Fogelsville, Pa. 18051

[73] Assignee: Paul M. Diemert, Fogelsville, Pa.

[21] Appl. No.: 885,621

[22] Filed: Mar. 13, 1978

[51] Int. Cl.² .............................................. B65G 53/40
[52] U.S. Cl. ..................................... 406/10; 137/386; 406/63; 406/125
[58] Field of Search ...................... 137/386; 214/17 B; 222/61, 193, 194; 302/49, 53, 55, 56, 59

[56] References Cited

U.S. PATENT DOCUMENTS 1,979,320  11/1934  Domina .................................. 302/55
3,799,622  3/1974  Hek ...................................... 302/59 X Primary Examiner—Frederick R. Schmidt
Attorney, Agent, or Firm—Sellers and Brace

[57] ABSTRACT

Apparatus for providing a continuous flow of fluent particulate material suspended in a gaseous stream from a bulk source. The pneumatically powered and controlled apparatus includes a material receiving chamber intermittently replenishing a second chamber operable to maintain a third or material dispensing chamber adequately charged at all times. The apparatus controls are responsive to the material level sensing means in the second chamber to initiate a recharging cycle when the material therein falls below a predetermined level.

22 Claims, 6 Drawing Figures

FLUENT MATERIAL HANDLING APPARATUS

This invention relates to fluent material handling equipment, and more particularly to an improved device for dispensing a continuous stream of fluid-suspended particulate material from a pressurized chamber refilled intermittently from a charging chamber equipped with level sensing means operable to control operation of a material recharging cycle.

BACKGROUND OF THE INVENTION

Numerous proposals have been made heretofore for equipment suitable for handling fluent particulate material from a bulk source and conveying this material in a continuous regulated stream to a point of use. Many of these machines make use of a pressurized gaseous stream as a material suspension and conveying medium. This transport mode requires suitable means for introducing the fluent material into the pressurized stream from a bin or other supply source subject to atmospheric pressure. A commonly utilized technique makes use of a continuously pressurized material dispensing chamber replenished from time to time from another normally pressurized chamber temporarily ventable to the atmosphere while being refilled from a supply source. Such equipment requires the use of flow control valves and operating means therefor operated in some predetermined sequence.

Ridley U.S. Pat. Nos. 2,949,275 and 3,090,593 each show material handling equipment utilizing manually controlled valves between the several fluent material handling chambers. Such equipment is relatively simple but requires skilled operators who pay strict attention to operating requirements and the need for manually controlling the several valves in proper sequence. Ryan U.S. Pat. No. 2,138,356 discloses a bag filling and weighing apparatus in which the various valves are controlled and operated electrically by a programming timer. The Kirchhoefer U.S. Pat. Nos. 3,190,509 and 3,315,824 also show automatically operated fluent material handling equipment using a timer to control solenoid operated valves in proper sequence. Such systems have the distinct disadvantage of requiring a source of electrical power not always available on construction projects. Moreover, electrical equipment exposed to the weather and to water typically encountered on construction projects pose hazards to the workmen and require special and expensive insulation safeguards. Domina U.S. Pat. No. 1,943,589 and 1,979,320 avoid the hazards and shortcomings posed by electric controls for fluid handling equipment and instead utilize pneumatically powered controls. However, his main control valve is driven through complex gear reduction mechanism from the motor operating the feeder for the material dispensing chamber. This expedient provided no assurance that the dispensing chamber will be refilled timely. Moreover, all of these prior machines are unnecessarily complex, bulky and costly to service and maintain.

SUMMARY OF THE INVENTION

The fluent material feeding apparatus of this invention is characterized by its unusual simplicity and the provision of efficient reliable control means for automatically replenishing the fluent material in the dispensing chamber when the supply in an intermediate feed chamber reaches a predetermined level. A single manually-reset valve restores the actuator for this valve to its armed or level-sensing position. Both the material dispensing apparatus and the controls therefor are powered pneumatically in timed sequence, and timing being controlled in part by the equalization of pressure across the material feed flow control valves, and in part by the position of the actuator for these valves.

Accordingly, it is a primary object of this invention to provide improved pneumatically-powered fluent material feeding apparatus.

Another object of the invention is the provision of apparatus for continuously dispensing fluid particulate material suspended in a gaseous stream.

Another object of the invention is the provision of apparatus for dispensing particulate matter in a fluid stream wherein the continuously pressurized material dispensing chamber is replenished periodically as the level in the resupply chamber reaches a predetermined low level.

Another object of the invention is the provision of apparatus for dispensing a stream of suspended particulate under pressure from a pressurized dispensing chamber replenished from a second pressurized chamber arranged to be automatically depressurized temporarily and periodically while being replenished from a non-pressurized source.

Another object of the invention is the provision of fluent material dispensing apparatus having three chambers arranged in series and interconnected by valves operable in sequence under the control of material level sensing means in the central chamber.

These and other more specific objects will appear upon reading the following specification and claims and upon considering in connection therewith the attached drawing to which they relate.

Referring now to the drawing in which a preferred embodiment of the invention is illustrated:

Figure 1:
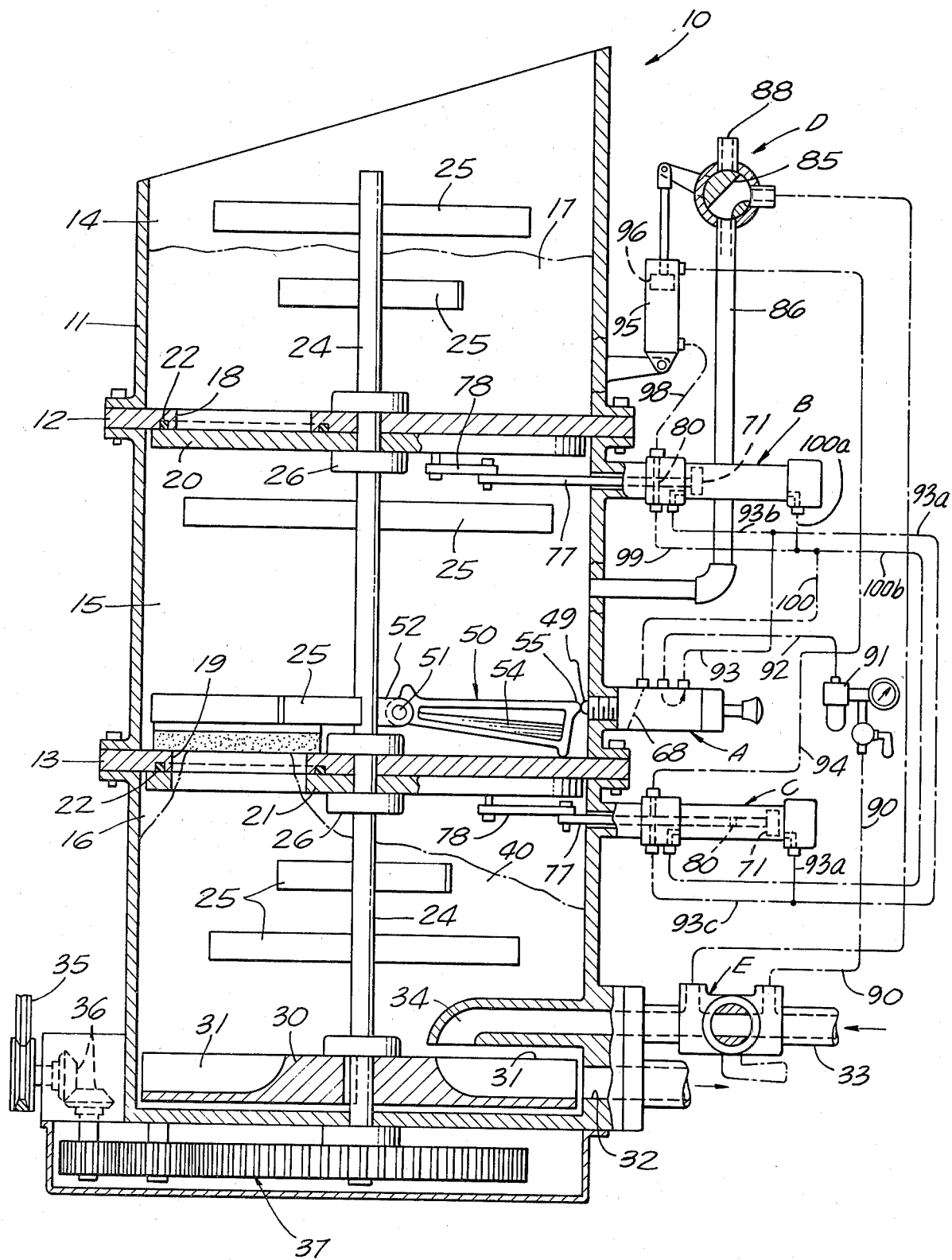
FIG. 1 is a vertical sectional view through the main material handling chamber of an illustrative embodiment of the apparatus and including a diagrammatic showing of the pneumatic control system and with the parts positioned to initiate a material replenishing cycle for the central chamber.

Referring to FIG. 1 there is shown an illustrative embodiment of a material feeding apparatus, designated generally 10, having a thick-walled main housing 11 divided by ported diaphragms 12, 13 into a first or a material receiving chamber 14, a second or replenishing chamber 15, and a third or material dispensing chamber 16. Receiving chamber 14 may be supplied with fluent material 17 from any convenient bulk source and typically is at atmospheric pressure. Ported diaphragms 12,13, separating chamber 15 from chambers 14 and 16, are each provided with three flow ports 18,19 normally closed by respective similarly ported rotary ported valves 20,21. Each valve has three flow ports (only one shown) each encircled by a suitable sealing gasket such as gaskets 22.

A power driven agitator spindle 24 extending vertically through all three chambers 14,15,16 are provided with agitator blades 25. Each of the valves 20,22 is journalled on and freely rotatable about spindle 24, these valves being held pressed against the sealing gaskets in diaphragms 12,13 by collars 26 clamped to the spindle by set screws or the like, not shown. Keyed to spindle 24 closely adjacent the bottom of chamber 16 is a conventional material feeding wheel 30 subdivided into radial sectors by radial vanes 31. The outer ends of these sectors open sequentially into the material dispensing duct 32. This material dispensing operation is performed by pressurized air supplied from a main source through a supply duct 33 and discharging through outlet 34 at the inner radial end of one of the dispensing sectors between blades 31. Spindle 24 is driven from a pneumatically operated motor, not shown, driving a belt 35 connected to spur gears 36 and driving speed reduction gearing 37 connected to the lower end of the spindle.

It will be apparent from the foregoing that the common drive for the agitator and feed wheel 30 advances first one and then another of the materialladen sectors between vanes 31 into alignment with the pressurized air outlet 34 and the inlet to the dispensing conduit 32. This operation serves to dispense a pressurized airborne stream of fluent material through the dispensing duct and to a point of utilization of the material. One particularly useful application of the invention apparatus is to dispense cementitious material in a plastering or cementing operation.

The control mechanism for the apparatus as well as the means for maintaining chamber 15 pressurized except during a replenishing cycle and chamber 16 pressurized at all times will now be described. The control includes five principal valves including the semi-automatic cycle control valve A, the combined valve and actuators B and C operating valves 20,21 respectively, venting valve D, and the main pressurized air control valve E.

Figure 2:
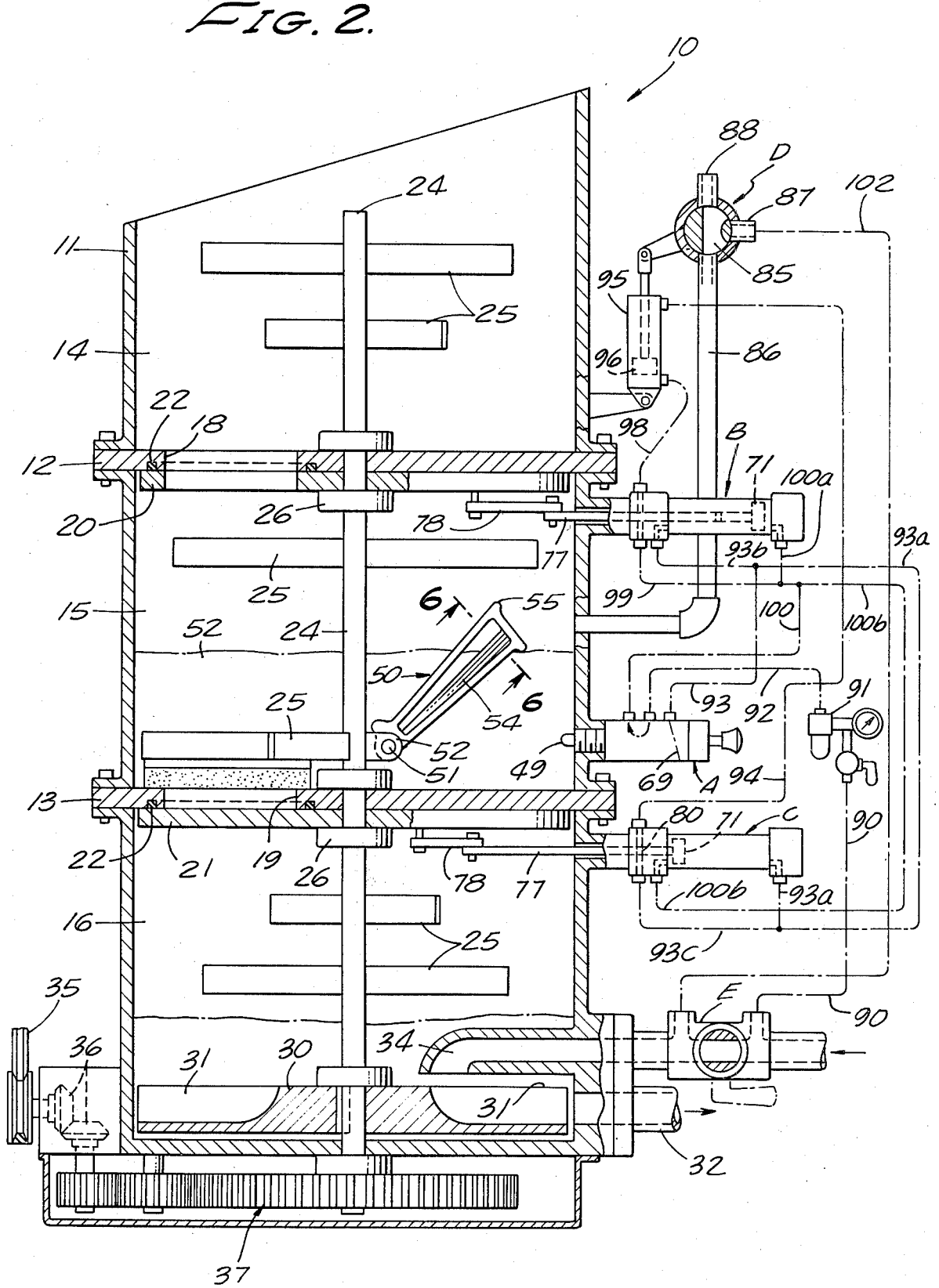
FIG. 2 is a view similar to FIG. 1 but showing the position of the control valve at the end of a material replenishing cycle with the main control valve reset and rearmed for the next replenishing cycle.

The cycle control valve A has a cylindrical main body 45 provided with a threaded boss 44 rigidly supporting the same in the sidewall of second chamber 15 in the location best shown in FIGS. 1 and 2. Reciprocably supported in bore 46 of body 45 is a spool valve 47 having an operating handle 48 mounted on its outer end thereof. The inner conical end 49 projects into chamber 15 into the path of a material level sensor 50.

Figures 4, 6:
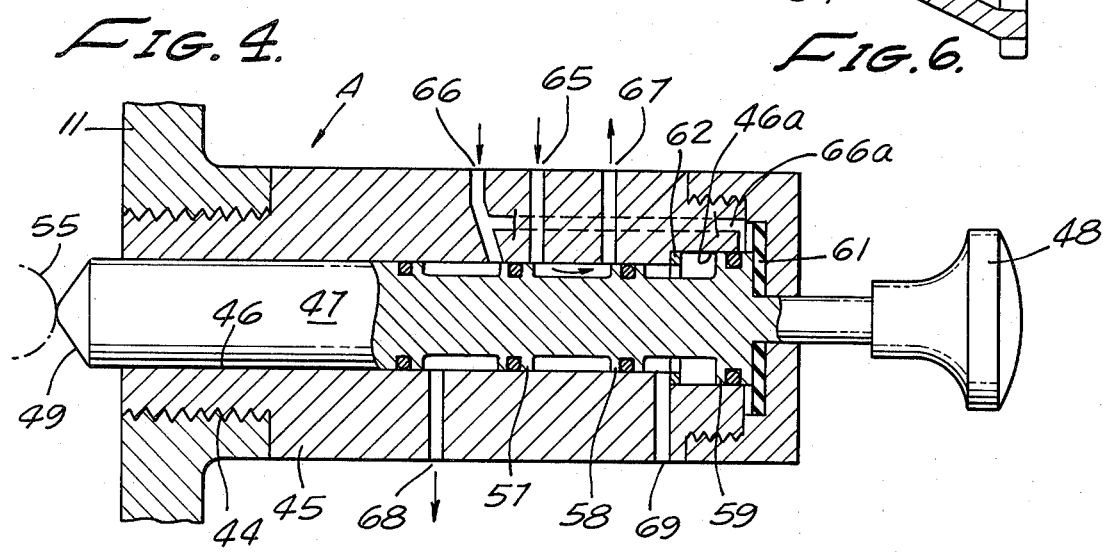
FIG. 4 is a cross-sectional view through the FIG. 3 valve while a replenishing cycle is in progress.
FIG. 6 is a cross-sectional view on an enlarged scale through the material level sensing means taken along line 6—6 on FIG. 2.

Sensor 50 is pivotally mounted at its inner end on a pivot pin 51 journalled in a bracket 52 carried by the agitator spindle 24, and has a cross-sectional shape best shown in FIG. 6. A principal feature is a vane 54 extending along the length of the sensor and inclined to a horizontal plane in a direction such that the rotation of the sensor with spindle 24 causes the sensor to pivot upwardly and ride generally on or close to the surface of the material 52 in chamber 15, such as the position indicated in FIG. 2. So long as there is a substantial quantity of fluent material in chamber 15 sensor 50 will be inclined upwardly. As the level of material 52 approaches the bottom of chamber 15, sensor 50 pivots downwardly until finally button 55 protruding radially from the outer upper end of the sensor contacts the end 49 of valve spool 47 and shifts the latter to its alternate position shown in FIG. 4 to initiate a material replenishing cycle for chamber 15.

Figure 3:
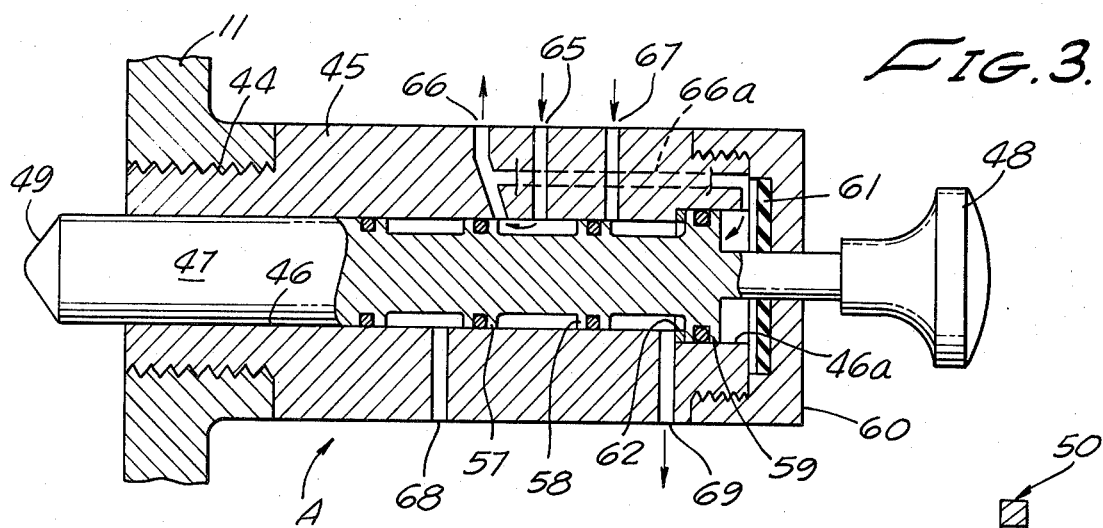
FIG. 3 is a cross-sectional view on an enlarged scale through the main control valve when armed in readiness to sense the need for a replenishing cycle.

Spool 47 of control valve A has first, second and third lands 57, 58, 59 lands 57, 58 having the same diameter and land 59 being somewhat larger and operating in a correspondingly larger diameter portion 46a of bore 46. These lands separate first, second, third and fourth annular grooves from one another as is apparent from FIGS. 3 and 4, the first groove being to the left of land 57 and the fourth groove being to the right of land 59. A buffer and sealing gasket 61 surrounds the spindle of the spool valve and abuts the end of land 59 when the spool is in its alternate position as shown in FIG. 4. A second buffer and seal gasket 62 seats against the shoulder at the base of bore 46a and limits the movement of the spool valve when in its initial or armed position as shown in FIG. 3.

Valve A has a single pressurized air inlet passage 65 located between a pair of passages 66,67, these latter passages serving alternately as pressurized air inlets and as outlet passages. There also are atmospheric vent passages 68,69 opening through the lower side of valve body 45. It will be observed that passage 66 has a branch 66a communicating with the right hand end of bore 46a. When the valve is in its armed position as shown in FIG. 3, pressurized air is usually present in passage 66 and acts against the right hand face of land 59 to hold the spool valve firmly in its armed position in opposition to the air pressure normally prevailing in chamber 15.

Figure 5:
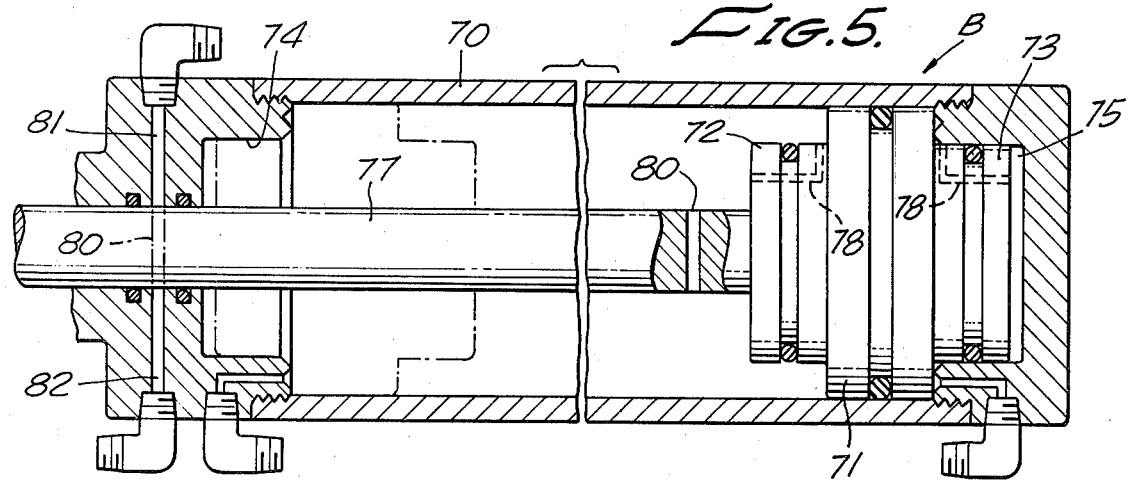
FIG. 5 is a cross-sectional view of an enlarged scale through one of the actuators for the material flow control valves.

Turning now to FIG. 5, a typical one of the identical combined actuators and valves B and C will be described. Each includes a two-way pneumatic power cylinder 70 slidably supporting a piston 71 having reduced ends 72,73 having a close sliding fit in wells 74 and 75 at the opposite ends of the cylinder. These wells serve as dash pots to slow down and snub the approach of piston 71 at the opposite ends of its stroke. Piston 71 is equipped with a piston rod 77 extending through the sidewall of the apparatus housing 11 and is connected by a pivoting link 78 with a respective one of valves 20,21 controlling the flow of fluent material toward the dispensing chamber 16. To be noted is the fact that each of the snubber pistons 73,72 is provided with an L-shaped restricted bleeder passage 78 permitting air to bleed slowly from wells 74,75 as the piston approaches one of the other end of its stroke. It will also be noted from FIG. 5 that each of the piston rods 77 is provided with a diametric passage 80. This passage is so located as to provide communication between aligned passages 81 and 82 only when piston 71 of both actuators B and C is at the left hand end of its cylinder.

Three-way valve D is operable when positioned as shown in FIG. 1 to supply pressurized air through passage 85 into the replenishing chamber 15 via conduit 86. However, when rotated 90° to its alternate position (FIG. 2), by its operating cylinder 95, the pressurized inlet 87 is closed and pressurized air present in chamber 15 is vented to the atmosphere through outlet 88.

OPERATION

Let it be assumed that the apparatus has been in operation for a period of time sufficient to substantially exhaust the contents of the replenishing or second chamber 15. At this time dispensing chamber 16 remains substantially full for obvious reasons and is available for dispensing during the recharging of chamber 15. At this time, upper valve 20 will be closed and lower valve 21 will be open and chambers 15 and 16 will be pressurized at a suitable operating pressure, such as 100 psi. As sensor 50 rotates with spindle 24, its button 55 will traverse end 49 of control valve A and shift spool 47 from the position shown in FIG. 3 to the position shown in FIG. 4. This allows the pressurized air in the enlarged end of bore 46a to vent to the atmosphere via passage 66a vent 68. Referring now to FIG. 1, it will be evident that pressurized air from the main supply conduit 33 will flow through line 90, filter 91, and via line 92 into inlet 65 of valve A. This air will then exit through passage 67 of valve A and flow through conduits 93, 93a into the right hand end of actuator C, causing piston 71 to move to the left to close valve 21. This valve closes without difficulty because both chambers 15,16 are at the same pressure. As piston 71 reaches the left hand end of its stroke, passage 80 and its piston rod 77 will align with passages 81,82 (FIG. 5) thereby allowing pressurized air in line 93a to pass through conduit 94 into the upper end of cylinder 95. This air will then force piston 96 downwardly as the air in the lower end of cylinder 95 exits through conduit 98, and passages 80,81, 82 of actuator B. In this connection it will be recalled that piston 71 of actuator B is at the left hand end of its stroke to maintain valve 20 closed. Hence passage 80 through its piston rod is aligned with passages 81, 82 thereby allowing air present in the lower end of cylinder 95 to escape to the atmosphere via conduit 98, passages 80,81,82, lines 99,100 and passage 68 of valve A.

The downward movement of the piston in cylinder 95 moves venting valve D to its alternate position wherein passage 85 of that valve vents chamber 15 to the atmosphere via conduits 86, passage 85 and the atmospheric outlet 88 while, at the same time cutting off the pressurized air to chamber 15. It will take a short period of time to relieve the pressure in chamber 15 via venting valve D but, as this pressure approaches atmospheric, pressurized air already present in conduits 93 and 93b will enter the left hand end of actuator B and force its piston 71 to the right thereby opening valve 20 so that material 17 present in receiving chamber 14 can flow through port 18 into and fill the replenishing chamber 15. Of course the movement of piston 71 to the right shifts its passage 80 out of alignment with passages 81,82 thereby closing off the outlet from the lower end of cylinder 95.

As the material flows into chamber 15, the continuing rotation of agitator 24,25 and of level sensor 50 causes this sensor to pivot upwardly about pivot pin 51 and away from the inner end 49 of the valve spool 47 in control valve A. However, this valve remains in its open position (FIG. 4) until the operator manually depresses button 48 to shift the spool back to its initial position shown in FIG. 3. Once returned to this armed position, the pressurized air always present in passage 65 of valve A enters passages 66, 66a and acts on the larger diameter land 59 to hold the spool valve safely in its normal armed position.

Concurrently, pressurized air exits via passage 66 in valve A and flows via passage 100 and connecting passage 100A into the right hand end of actuator B causing the piston of that actuator to shift to the left and close valve 20 between chambers 14,15. Pressurized air also enters passage 100B leading into the left hand end of actuator C but it is unable, at this time, to open valve 21 because of the high pressure then prevailing in chamber 16 and the low pressure prevailing in chamber 15 thereby clamping valve 21 closed. Since valve A is rearmed to the position shown in FIGS. 2 and 3, pressurized air now present in line 100 passes via lines 99,80,81,82, and 98 to cylinder 95. Cylinder 95 acts to close venting valve D to repressurized chamber 15 via line 102, valve D and line 86. As soon as the pressure in chamber 15 has been equalized with that in chamber 16, pressurized air present in line 100B acts on piston 71 of actuator C to reopen valve 21.

It will be understood that prior to the reopening of valve 21, passage 80 of actuator C is in communication through conduit 94 with the upper end of cylinder 95 with the result that air from this cylinder can be vented to the atmosphere through passage 80 of actuator C, and line 93c in communication with lines 93a,93 and venting passages 67 and 69 of control valve A.

The operating cycle is now complete and the apparatus continues to dispense pressurized airborne fluent material and to replenish chamber 15 periodically as its charge.

While the particular fluent material handling apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Pneumatically operated fluent material feeding apparatus comprising:
   (a) first, second and third chambers arranged in a vertical stack and separated from one another by first and second pneumatically operable valves said first chamber being uppermost and vented to the atmosphere and said second and third chambers including means normally maintaining the same charged with pressurized air;
   (b) said third chamber being lowermost and equipped with pneumatically powered means for discharging a pressurized stream of fluent material and air therefrom;
   (c) non-electrical fluent material level sensing means in said second chamber;
   (d) normally closed pneumatically-operable air vent means for said second chamber; and
   (e) pressurized air flow control means responsive to said level sensing means when the material in said second chamber reaches a predetermined low level to close said second valve, interrupt the supply of pressurized air to said second chamber, open said air vent means and open said first valve in predetermined order and in out-of-phase sequence thereby to recharge said second chamber with fluent material from said first chamber while continuing to discharge a pressurized stream of fluent material and air from said third chamber.

2. Fluent material feeding apparatus as defined in claim 1 characterized in that said means controlling the sequential operation of said first and second valves and said air venting means included (1) normally closed third valve means operable to the open position thereof by said first valve as said first valve reaches its closed position and (2) normally open fourth valve means operable by said first valve when closed controlling the flow of pressurized operating air to said normally closed air venting means.

3. Fluent material feeding apparatus as defined in claim 2 characterized in the provision of means for reversing the sequential operating cycle of said pressurized air flow control means after said second chamber has been recharged with fluent material.

4. Fluent material feeding apparatus as defined in claim 1 characterized in that said material level sensing means in said second chamber is pneumatically powered for movement in a generally horizontal plane and includes means operable to maintain a portion thereof adjacent the surface of the material in said second chamber.

5. Fluent material feeding apparatus as defined in claim 4 characterized in that said level sensing means comprises a rigid member having a surface thereof movable in contact with the fluent material in said second chamber which surface is inclined upwardly with respect to a horizontal plane and forwardly in the direction of movement thereof whereby said sensing means tends to remain on or near the upper surface of said fluent material while being moved across said material.

6. Apparatus for continuously dispensing an airborne stream of fluent material comprising:
  (a) first, second and third fluent material chambers in a stack and adapted to be placed in communication through a first normally closed pneumatically powered valve between said first and second chambers and through a second normally open pneumatically powered valve between said second and third chambers;
  (b) power-driven means for agitating the material in each of said chambers and for dispensing fluent material suspended in pressurized air from said third chamber; and including means normally supplying pressurized air to said second chamber and for maintaining said third chamber charged with pressurized air while said apparatus is in use;
  (c) pneumatically powered valve means operable to discontinue the supply of pressurized air to said second chamber and for venting said second chamber to the atmosphere when said second chamber is being charged with fluent material from said first chamber and
  (d) control means including means automatically responsive to a predetermined depletion of fluent material in said second chamber to initiate a cycle to operate said pneumatically powered valve means and to operate said first and second pneumatically powered valves to transfer fluent material from said first chamber to said second chamber to replenish the charge of material in said second chamber without interrupting the discharge of fluent material from said third chamber.

7. Fluent material handling apparatus as defined in claim 6 characterized in that said control means responsive to the depletion of material in said second chamber includes means responsive to the closing operations of said second valve to supply pressurized air to (a) said pneumatically powered venting valve means to open the same and to (b) said first pneumatically powered valve to open said first valve thereby allowing fluent material to flow from said first chamber into said second chamber.

8. Fluent material handling apparatus as defined in claim 7 characterized in the provision of means for reversing said control means and for thereby restoring each of said first and second valves to their respective positions at the start of said recharging cycle.

9. Fluent material handling apparatus as defined in claim 6 characterized in that said control means includes a two-position valve controlling the flow of pressurized air to said first and second valves and to said venting valve means for said second chamber, and said control means also including means movable with said power-driven agitating means operable to sense the approaching depletion of material in said second chamber and to then shift said two-position valve to an alternate one of said two positions to initiate said material recharging cycle for said second chamber.

10. Fluent material handling apparatus as defined in claim 9 characterized in that said two-position valve comprises:
  (a) a main body having a central bore opening at one end into said second chamber;
  (b) a spool valve slidably supported in said bore for movement between two positions and having one end projecting into said second chamber for contact by said material depletion sensing means when the material falls below a predetermined level;
  (c) said spool valve having first, second, third and fourth annular grooves separated by first, second and third annular lands;
  (d) said main body having (1) a pressurized fluid supply passage continuously in communication with said second groove; (2) separate fluid venting passages in continuous communication with said first and third grooves; a fluid passage in selective communication with said first and second grooves depending upon the position of said spool valve axially of said bore, and in communication with said fourth groove when in communication with said first groove; and (3) a fluid passage in selective communication with said second and third grooves depending upon the position of said spool valve axially of said bore; and
  (e) means for shifting said spool valve to the second one of said operating positions after said second chamber has been refilled with fluent material.

11. Fluent material handling apparatus as defined in claim 6 characterized in that said first and second pneumatic valves each include a reversible air motor and an associated air flow control valve, the air motor for said first valve being operable to open its associated flow control valve when said first valve is open, and the air motor for said second valve being operable to open its associated flow control valve when said second valve is closed.

12. Fluent material handling apparatus as defined in claim 11 characterized in that said first and second valves include pneumatic dash pot means for cushioning the end portion of each operating stroke of the associated air motor.

13. Fluent material handling apparatus as defined in claim 11 characterized in that said reversible air motors each comprise a dual action cylinder and piston assembly, said piston having a piston rod provided with an air passage adapted to provide communication between a pair of passages in said air motor only when said piston is in a predetermined position and to block flow between said pair of passages in all other positions of said piston.

14. Fluent material handling apparatus as defined in claim 11 characterized in that said reversible air motors each comprise a cylinder and a piston attached to a piston rod, and said air flow control valves associated with said air motors comprising a separate valve body embracing each of said piston rods and having an air flow passage thereacross alignable with a flow passage through said piston rod when the attached piston is in a predetermined position.

15. Fluent material handling apparatus as defined in claim 6 characterized in that said control means includes time delay means for delaying the opening of said venting valve means until said first valve is closed.

16. Fluent material handling apparatus as defined in claim 6 characterized in that said control means includes time delay means for delaying the closing of said venting valve means until said second valve is reopening after a material recharging cycle for said second chamber.

17. Fluent material handling apparatus as defined in claim 6 characterized in that said control means for initiating a recharging cycle for said second chamber includes a material level sensing means in said second chamber, and a two-position air flow control valve normally positioned to supply pressurized air effective to hold said first valve and said air venting means closed and said second valve open, and said material level sensing means being operable when the material in said second chamber falls to a pre-determined level to move said two-position flow control valve to the alternate position thereof and thereby initiate said recharging cycle.

18. Fluent material handling apparatus as defined in claim 17 characterized in that said level sensing means includes means for moving the same in a generally horizontal plane over the surface of material in said second chamber and having a downwardly facing surface inclined upwardly and forwardly in the direction of movement of said level sensing means.

19. Pneumatically operated fluent material feeding apparatus comprising:
 (a) first, second and third chambers arranged in a vertical stack and separated from one another by first and second normally closed disc valves each having power operator means for rotating the same in the plane thereof between open and closed position;
 (b) said third chamber being lowermost and equipped with pneumatically powered means for discharging a stream of fluent material suspended in air;
 (c) normally closed air vent means for said second chamber;
 (d) means normally maintaining said second and third chambers charged with pressurized air;
 (e) pneumatic control means for said first and second valves and said air vent means and including means in said second chamber for sensing the depletion of material therein to replenish said material from a supply thereof in said first chamber, said control means being operable in response to depletion of material in said second chamber as preset by said sensing means to first close said second valve, then discontinue pressurized air to said second chamber and vent pressurized air therefrom, and thereafter open said first disc valve to refill said second chamber with fluent material from said first chamber.

20. Fluent material feeding apparatus as defined in claim 19 characterized in that said disc valves are provided with a plurality of openings spaced about the axis of rotation thereof, and sealing gasket means positioned against one face of said disc valves and about the flow openings for material passing through said valves when open.

21. Fluent material feeding apparatus as defined in claim 19 characterized in the provision of power driven agitator means including an operating shaft extending through said first, second and third chambers, and said disc valves being supported for rotation about the axis of said operating shaft while moving between open and closed position.

22. Fluent material feeding apparatus as defined in claim 19 characterized in that said power operator means for opening and closing said first and second disc valves is automatically held inoperative to do so until the pressure differential across a respective one of said valves is substantially equalized.

* * * * *